(12) United States Patent
Kikuchi et al.

(10) Patent No.: US 12,741,285 B2
(45) Date of Patent: Sep. 22, 2026

(54) METHOD OF MANUFACTURING INORGANIC MATERIAL

(71) Applicant: FURUKAWA CO., LTD., Tokyo (JP)

(72) Inventors: Masaaki Kikuchi, Tsukuba (JP); Shogo Suzuki, Tsukuba (JP); Norihiko Sumi, Tsukuba (JP)

(73) Assignee: FURUKAWA CO., LTD., Tokyo (JP)

( * ) Notice: Subject to any disclaimer, the term of this patent is extended or adjusted under 35 U.S.C. 154(b) by 754 days.

(21) Appl. No.: 18/031,712

(22) PCT Filed: Oct. 8, 2021

(86) PCT No.: PCT/JP2021/037334

§ 371 (c)(1),
(2) Date: Apr. 13, 2023

(87) PCT Pub. No.: WO2022/080254

PCT Pub. Date: Apr. 21, 2022

(65) Prior Publication Data

US 2023/0381787 A1 Nov. 30, 2023

(30) Foreign Application Priority Data

Oct. 15, 2020 (JP) ................................ 2020-173894

(51) Int. Cl.
*B02C 17/16* (2006.01)
*H01M 10/0562* (2010.01)

(52) U.S. Cl.
CPC ....... *B02C 17/161* (2013.01); *H01M 10/0562* (2013.01); *H01M 2300/0068* (2013.01)

(58) Field of Classification Search
CPC ..... B02C 17/161; B02C 17/002; B02C 17/02; B02C 17/20; B02C 23/08; H01M 10/0562;

(Continued)

(56) References Cited

U.S. PATENT DOCUMENTS 8,733,552 B2 5/2014 Ikeda
10,461,363 B2 10/2019 Kanno et al.
(Continued)

FOREIGN PATENT DOCUMENTS

CN 105013591 A 11/2015
CN 205042552 U 2/2016
(Continued)

OTHER PUBLICATIONS

Office Action dated Jun. 4, 2024, issued in counterpart JP Application No. 2022-556911. (4 pages).

(Continued)

*Primary Examiner* — Jacob S. Scott
*Assistant Examiner* — Miraj T. Patel
(74) *Attorney, Agent, or Firm* — WHDA, LLP

(57) ABSTRACT

A method of manufacturing an inorganic material includes: a step (A) of preparing a first inorganic material as a raw material; a step (B) of obtaining a second inorganic material by crushing the first inorganic material using a ball mill to obtain fine particles of the first inorganic material, the ball mill including a cylindrical container and crushing balls; and a step (C) of separating the second inorganic material from the crushing balls to which the second inorganic material is attached, in which the step (B) includes a step (B1) of putting the first inorganic material and the crushing balls into the cylindrical container and subsequently rotating the cylindrical container about a cylindrical shaft and a step (B2) of moving the cylindrical container such that the first inorganic material moves in the cylindrical shaft direction.

17 Claims, 11 Drawing Sheets

(58) Field of Classification Search
CPC ....... H01M 2300/0068; H01M 4/5825; H01M 4/36; H01M 10/052; C01B 25/14; Y02E 60/10
See application file for complete search history.

(56) References Cited

U.S. PATENT DOCUMENTS

| | | | | |
|---|---|---|---|---|
| 2011/0226676 | A1 | 9/2011 | Ikeda | |
| 2014/0117131 | A1 | 5/2014 | Gouko et al. | |
| 2017/0155168 | A1 | 6/2017 | Kanno et al. | |
| 2017/0326189 | A1* | 11/2017 | Aouf | A61K 9/14 |
| 2022/0085407 | A1* | 3/2022 | Yoshida | H01B 1/10 |
| 2024/0075480 | A1* | 3/2024 | Liao | B02C 18/10 |

FOREIGN PATENT DOCUMENTS

| | | | | |
|---|---|---|---|---|
| CN | 207769936 | U | | 8/2018 |
| JP | 114671 | | | 10/1935 |
| JP | S60-031836 | A | | 2/1985 |
| JP | H07-8353 | B2 | | 2/1995 |
| JP | 2004-216373 | A | | 8/2004 |
| JP | 2005-066406 | A | | 3/2005 |
| JP | 2007190480 | A | * | 8/2007 |
| JP | 2014-111246 | A | | 6/2014 |
| JP | 2015-076181 | A | | 4/2015 |
| JP | 2016-27545 | A | | 2/2016 |
| JP | 2017-218330 | A | | 12/2017 |
| JP | 2019-071210 | A | | 5/2019 |
| WO | 2010/140336 | A1 | | 12/2010 |

OTHER PUBLICATIONS

Office Action dated Sep. 9, 2025, issued in counterpart JP Application No. 2024-232834. (2 pages).

Office Action dated Aug. 20, 2024, issued in counterpart JP Application No. 2022-556911. (3 pages).

International Search Report dated Nov. 9, 2021, issued in counterpart International Application No. PCT/JP2021/037334 (3 pages).

* cited by examiner

100
X
X
101
100
X
101

A−A´(30)

METHOD OF MANUFACTURING INORGANIC MATERIAL

TECHNICAL FIELD

The present invention relates to a method of manufacturing an inorganic material.

BACKGROUND ART

In general, a lithium ion battery is used as a power supply of a small mobile device such as a mobile phone or a laptop. In addition, recently, the lithium ion battery has been used not only as a power supply of a small mobile device but also as a power supply of an electric vehicle, an electric power storage, or the like.

In a currently commercially available lithium ion battery, an electrolytic solution including a combustible organic solvent is used. On the other hand, in a lithium ion battery (hereinafter, also referred to as "all-solid-state lithium ion battery") in which a solid electrolyte is replaced with the electrolytic solution such that the entire battery is made of a solid, a combustible organic solvent is not used in the battery. Therefore, it is considered that a safety device can be simplified and manufacturing costs or productivity is excellent.

As a solid electrolyte material used for the solid electrolyte, for example, a sulfide-based solid electrolyte material is known.

Patent Document 1 (Japanese Unexamined Patent Publication No. 2016-27545) describes a sulfide-based solid electrolyte material having a peak at a position of $2\theta=29.86°\pm1.00°$ in X-ray diffraction measurement using a CuKα ray and a composition of $Li_{2y+3}PS_4$ ($0.1\leq y\leq 0.175$).

RELATED DOCUMENT

Patent Document

[Patent Document 1] Japanese Unexamined Patent Publication No. 2016-27545

SUMMARY OF THE INVENTION

Technical Problem

The energy density of an all-solid-state lithium ion battery can be increased, for example, reducing the proportion of a solid electrolyte material in an electrode active material layer or reducing the thickness of a solid electrolyte layer between a positive electrode and a negative electrode.

Here, in order to reduce the proportion of the solid electrolyte material in the electrode active material layer or to reduce the thickness of the solid electrolyte layer, it is preferable that the solid electrolyte material has a small average particle size.

According to an investigation by the present inventors, the following was clarified. The sulfide-based inorganic solid electrolyte material described in Patent Document 1 includes sulfur. Therefore, the sulfide-based inorganic solid electrolyte material is soft and, when strongly crushed, may aggregate and be fixed to an inner wall of a cylindrical container.

The present invention has been made under these circumstances, and an object thereof is to provide a method of manufacturing an inorganic material in which the formation of an aggregate is suppressed and an inorganic material having a small average particle size can be obtained.

Solution to Problem

According to one aspect of the present invention, there is provided a method of manufacturing an inorganic material, the method including:

a step (A) of preparing a first inorganic material as a raw material; and a step (B) of obtaining a second inorganic material by crushing the first inorganic material using a ball mill to obtain fine particles of the first inorganic material, the ball mill including a cylindrical container and crushing balls; and a step (C) of separating the second inorganic material from the crushing balls to which the second inorganic material is attached, in which the step (B) includes a step (B1) of putting the first inorganic material and the crushing balls into the cylindrical container and subsequently rotating the cylindrical container about a cylindrical shaft and a step (B2) of moving the cylindrical container such that the first inorganic material moves in the cylindrical shaft direction.

Advantageous Effects of Invention

According to the aspect of the present invention, it is possible to provide a method of manufacturing an inorganic material in which the formation of an aggregate is suppressed and an inorganic material having a small average particle size can be obtained.

DESCRIPTION OF EMBODIMENTS

Figures 1A, 1B:
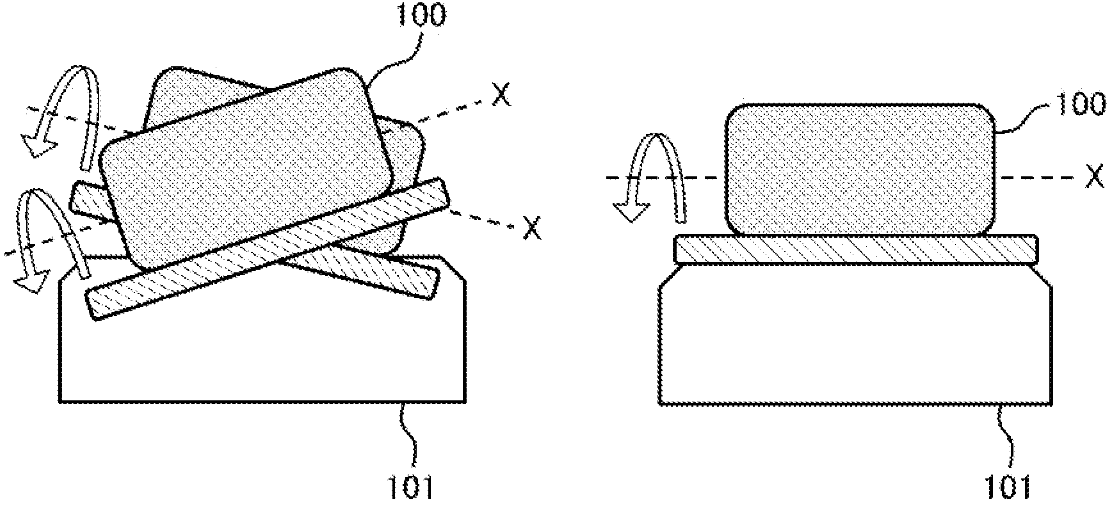
FIG. 1(*a*) and FIG. 1(*b*) are schematic views showing movements of ball mills according to Examples 1 and 2 and Comparative Examples, in which FIG. 1(*a*) shows Examples 1 and 2 and FIG. 1(*b*) represents Comparative Examples.

Hereinafter, an embodiment of the present invention will be described using the drawings. In all the drawings, the same components are represented by common reference numerals, and the description thereof will not be repeated. Unless specified otherwise, a numerical range "A to B" represents A or more and B or less.

First Embodiment

A method of manufacturing an inorganic material according to a first embodiment includes: a step (A) of preparing a first inorganic material as a raw material; a step (B) of obtaining a second inorganic material by crushing the first inorganic material using a ball mill to obtain fine particles of the first inorganic material, the ball mill including a cylindrical container and crushing balls; and a step (C) of separating the second inorganic material from the crushing balls to which the second inorganic material is attached, in which the step (B) includes a step (B1) of putting the first inorganic material and the crushing balls into the cylindrical container and subsequently rotating the cylindrical container about a cylindrical shaft and a step (B2) of moving the cylindrical container such that the first inorganic material moves in the cylindrical shaft direction.

With the method of manufacturing an inorganic material according to the present embodiment, the formation of an aggregate can be suppressed, and an inorganic material having a small average particle size can be obtained. In addition, the more second inorganic material can also be attached to crushing balls than the second inorganic material be attached to an inner wall of a cylindrical container, and the second inorganic material attached to the crushing balls can be recovered.

Hereinafter, each of the steps will be described in detail.

(Step (A))

First, a first inorganic material as a raw material is prepared. The first inorganic material may be manufactured or may be available as a commercially available product.

The first inorganic material is not particularly limited as long as it is a material of which fine particles can be obtained, and examples of the first inorganic material include an inorganic solid electrolyte material, a positive electrode active material, and a negative electrode active material.

The inorganic solid electrolyte material is not particularly limited, and examples thereof include a sulfide-based inorganic solid electrolyte material, an oxide-based inorganic solid electrolyte material, and other lithium-based inorganic solid electrolyte materials. Among these, a sulfide-based inorganic solid electrolyte material is preferable.

In addition, the inorganic solid electrolyte material is not particularly limited, and examples thereof include an inorganic solid electrolyte material used for a solid electrolyte layer forming an all-solid-state lithium ion battery.

Examples of the sulfide-based inorganic solid electrolyte material include a $Li_2S$—$P_2S_5$ material, a $Li_2S$—$SiS_2$ material, a $Li_2S$—$GeS_2$ material, a $Li_2S$—$Al_2S_3$ material, a $Li_2S$—$SiS_2$—$Li_3PO_4$ material, a $Li_2S$—$P_2S_5$—$GeS_2$ material, a $Li_2S$—$Li_2O$—$P_2S_5$—$SiS_2$ material, a $Li_2S$—$GeS_2$—$P_2S_5$—$SiS_2$ material, a $Li_2S$—$SnS_2$—$P_2S_5$—$SiS_2$ material, a $Li_2S$—$P_2S_5$—$Li_3N$ material, a $Li_2S_{2+x}$—$P_4S_3$ material, and a $Li_2S$—$P_2S_5$—$P_4S_3$ material.

Among these, the $Li_2S$—$P_2S_5$ material and the $Li_2S$—$P_2S_5$—$Li_3N$ material are preferable from the viewpoint that it has excellent lithium ionic conductivity and has stability to the extent that decomposition or the like does not occur in a wide voltage range. Here, for example, the $Li_2S$—$P_2S_5$ material refers to an inorganic material obtained by a chemical reaction caused by mechanically processing an inorganic composition including at least $Li_2S$ (lithium sulfide) and $P_2S_5$, and the $Li_2S$—$P_2S_5$—$Li_3N$ material refers to an inorganic material obtained by a chemical reaction caused by mechanically processing an inorganic composition including at least $Li_2S$ (lithium sulfide), $P_2S_5$, and $Li_3N$.

Here, in the present embodiment, examples of the lithium sulfide include lithium polysulfide.

Examples of the oxide-based inorganic solid electrolyte material include: a NASICON type such as $LiTi_2(PO_4)_3$, $LiZr_2(PO_4)_3$, or $LiGe_2(PO_4)_3$, a perovskite type such as $(La_{0.5+x}Li_{0.5-3x})\ TiO_3$; a $Li_2O$—$P_2O_5$ material; and a $Li_2O$—$P_2O_5$—$Li_3N$ material.

Examples of the other lithium-based inorganic solid electrolyte material include LiPON, $LiNbO_3$, $LiTaO_3$, $Li_3PO_4$, $LiPO_{4-x}N_x$ (x satisfies $0<x\leq1$), LiN, LiI, and LISICON.

Further, a glass ceramic obtained by precipitating crystals of the inorganic solid electrolytes can also be used as the inorganic solid electrolyte material.

It is preferable that the sulfide-based inorganic solid electrolyte material according to the present embodiment includes Li, P, and S as constituent elements. In addition, in the sulfide-based inorganic solid electrolyte material according to the present embodiment, from the viewpoint that a smaller average particle size can be obtained, it is preferable that the sulfide-based inorganic solid electrolyte material as the first inorganic material is in a vitreous state.

In addition, from the viewpoint of further improving the lithium ionic conductivity, the electrochemical stability, and the stability and the handling properties of the sulfide-based inorganic solid electrolyte material according to the embodiment in water or air, a molar ratio (Li/P) of the content of Li to the content of P in the solid electrolyte material is preferably 1.0 or higher and 10.0 or lower, more preferably 2.0 or higher and 5.0 or lower, still more preferably 2.5 or higher and 4.0 or lower, still more preferably 2.8 or higher and 3.6 or lower, still more preferably 3.0 or higher and 3.5 or lower, still more preferably 3.1 or higher and 3.4 or lower, and still more preferably 3.1 or higher and 3.3 or lower. In addition, a molar ratio (S/P) of the content of S to the content of P is preferably 1.0 or higher and 10.0 or lower, more preferably 2.0 or higher and 6.0 or lower, more preferably 3.0 or higher and 5.0 or lower, still more preferably 3.5 or higher and 4.5 or lower, still more preferably 3.8 or higher and 4.2 or lower, still more preferably 3.9 or higher and 4.1 or lower, and still more preferably 4.0.

Here, the contents of Li, P, and S in the solid electrolyte material according to the present embodiment can be obtained, for example, by ICP emission spectroscopy or X-ray photoelectron spectroscopy.

The sulfide-based inorganic solid electrolyte material according to the present embodiment can be used for any application where lithium ionic conductivity is required. In particular, it is preferable that the sulfide-based inorganic solid electrolyte material according to the present embodiment is used for a lithium ion battery. More specifically, the sulfide-based inorganic solid electrolyte material according to the present embodiment is used for a positive electrode active material layer, a negative electrode active material layer, an electrolyte layer, or the like in a lithium ion battery. Further, the sulfide-based inorganic solid electrolyte material according to the present embodiment is suitably used for a positive electrode active material layer, a negative electrode active material layer, a solid electrolyte layer, or the like forming an all-solid-state lithium ion battery, and is more suitably used for a solid electrolyte layer forming an all-solid-state lithium ion battery.

Examples of the all-solid-state lithium ion battery to which the sulfide-based inorganic solid electrolyte material according to the present embodiment is applied include an all-solid-state lithium ion battery in which a positive electrode, a solid electrolyte layer, and a negative electrode are stacked in this order.

The positive electrode active material is not particularly limited, and examples of the positive electrode active material include a positive electrode active material that can be used for a positive electrode layer of a lithium ion battery.

Examples of the positive electrode active material include a composite oxide such as a lithium cobalt oxide ($LiCoO_2$), a lithium nickel oxide ($LiNiO_2$), a lithium manganese oxide ($LiMn_2O_4$), a solid solution oxide ($Li_2MnO_3$-$LiMO_2$ (M=Co, Ni, or the like)), lithium-manganese-nickel oxide ($LiNi_{1/3}Mn_{1/3}Co_{1/3}O_2$), or an olivine-type lithium phosphorus oxide ($LiFePO_4$); and a sulfide-based positive electrode active material such as CuS, a Li—Cu—S compound, $TiS_2$, FeS, $MoS_2$, $V_2S_5$, a Li—Mo—S compound, a Li—Ti—S compound, a Li—V—S compound, or a Li—Fe—S compound.

The negative electrode active material is not particularly limited, and examples of the negative electrode active material include a negative electrode active material that can be used for a negative electrode layer of a lithium ion battery. Examples of the negative electrode active material include: a metal material mainly formed of a lithium alloy, a tin alloy, a silicon alloy, a gallium alloy, an indium alloy, or an aluminum alloy; a lithium titanium composite oxide (for example, $Li_4Ti_5O_{12}$), and a graphite material.

Hereinafter, a method of manufacturing the sulfide-based inorganic solid electrolyte material in the vitreous state will be described.

The sulfide-based inorganic solid electrolyte material in the vitreous state can be obtained, for example, by preparing a mixture including lithium sulfide and phosphorus sulfide and mechanical processing this mixture such that the lithium sulfide and the phosphorus sulfide as raw materials are vitrified in a chemical reaction.

The mixture including lithium sulfide and phosphorus sulfide can be obtained, for example, by mixing the respective raw materials at a predetermined molar ratio such that the target sulfide-based inorganic solid electrolyte material has a desired composition ratio.

Here, the mixing ratio between the respective raw materials in the mixture is adjusted such that the obtained sulfide-based inorganic solid electrolyte material has a desired composition ratio.

A method of mixing the respective raw materials is not particularly limited as long as it is a mixing method capable of uniformly mixing the respective raw materials. For example, the raw materials can be mixed using a ball mill, a beads mill, a vibrating mill, an impact crushing device, a mixer (for example, a pug mixer, a ribbon mixer, a tumbler mixer, a drum mixer, or a V-type mixer), a kneader, a twin-screw kneader, an air flow grinder, or the like.

Mixing conditions such as a stirring rate, a processing time, a temperature, a reaction pressure, or a gravitational acceleration applied to the mixture during the mixing of the respective raw materials can be appropriately determined depending on the amount of the mixture processed.

The lithium sulfide used as a raw material is not particularly limited, and a commercially available lithium sulfide may be used. For example, lithium sulfide obtained by reaction of lithium hydroxide and hydrogen sulfide may also be used. From the viewpoint of obtaining the high-purity sulfide-based inorganic solid electrolyte material and suppressing a side reaction, it is preferable that lithium sulfide having little impurities is used.

Here, in the present embodiment, examples of the lithium sulfide include lithium polysulfide. As the lithium sulfide, $Li_2S$ is preferable.

The phosphorus sulfide used as a raw material is not particularly limited. For example, commercially available phosphorus sulfide (for example, $P_2S_5$, $P_4S_3$, $P_4S_7$, or $P_4S_5$) can be used. From the viewpoint of obtaining the high-purity sulfide-based inorganic solid electrolyte material and suppressing a side reaction, it is preferable that phosphorus sulfide having little impurities is used. As the phosphorus sulfide, $P_2S_5$ is preferable.

Lithium nitride may be further used as a raw material. Here, Nitrogen in the lithium nitride is discharged into the system as $N_2$. Therefore, by using lithium nitride as a raw material, only the Li composition can be increased with respect to the sulfide-based inorganic solid electrolyte material including Li, P, and S as constituent elements.

The lithium nitride according to the present embodiment is not particularly limited, and a commercially available lithium nitride (for example, $Li_3N$) may be used. For example, lithium nitride obtained by reaction of metallic lithium (for example, Li foil) and nitrogen gas may also be used. From the viewpoint of obtaining the high-purity solid electrolyte material and suppressing a side reaction, it is preferable that lithium nitride having little impurities is used.

Next, the sulfide-based inorganic solid electrolyte material in the vitreous state is obtained by mechanically processing the mixture including lithium sulfide and phosphorus sulfide such that the lithium sulfide and the phosphorus sulfide as raw materials are vitrified in a chemical reaction.

Here, the mechanical process refers to a process of causing two or more kinds of inorganic compounds to mechanically collide with each other to be vitrified in a chemical reaction, for example, a mechanochemical process.

In addition, from the viewpoint of realizing an environment where water or oxygen is removed at a high level in the vitrification step, it is preferable that the mechanical process is performed in a dry condition, and it is more preferable that the mechanical process is a dry mechanochemical process.

By using the mechanochemical process, the respective raw materials can be mixed while crushing the raw materials into fine particles. Therefore, the contact area of the respective raw materials can be increased. As a result, the reaction of the respective raw materials can be accelerated. The sulfide-based inorganic solid electrolyte material in the vitreous state can be obtained with higher efficiency.

Here, the mechanochemical process refers to a method of vitrifying a target composition while applying a mechanical energy such as a shear force, an impact force, or a centrifugal force thereto. Examples of a device for performing the vitrification through the mechanochemical process include: a crusher and disperser such as a ball mill, a beads mill, a vibrating mill, a turbo mill, a mechano-fusion, a disc mill, or a roll mill; a rotation and impact crushing device including a mechanism as a combination of rotation (shearing stress) and impact (compressive stress) represented by a rock drill, a vibration drill, or an impact driver; and a high-pressure grinding roll. In particular, from the viewpoint of efficiently generating a very high impact energy, a ball mill or a beads mill is preferable, and a ball mill is more preferable. In addition, from the viewpoint of obtaining excellent continuous productivity, for example, a roll mill; a rotation and impact crushing device including a mechanism as a combination of rotation (shearing stress) and impact (compressive stress) represented by a rock drill, a vibration drill, or an impact driver; or a high-pressure grinding roll is preferable.

In addition, it is preferable that the mechanochemical process is performed in an inert atmosphere. As a result, a reaction of the sulfide-based inorganic solid electrolyte material with water vapor, oxygen, or the like can be suppressed.

In addition, the inert atmosphere refers to a vacuum atmosphere or an inert gas atmosphere. In the inert atmosphere, in order to avoid contact with water, the dew point is preferably −30° C. or lower, more preferably −50° C. or lower, and still more preferably −60° C. or lower. The inert gas atmosphere refers to an atmosphere of inert gas such as argon gas, helium gas, or nitrogen gas. In order to prevent impurities from being mixed in a product, it is preferable that the purity of the inert gas is as high as possible. A method of introducing the inert gas into the mixed system is not particularly limited as long as it is a method capable of filling the mixed system with the inert gas atmosphere. Examples of the introduction method include a method of purging inert gas and a method continuously introducing inert gas at a given flow rate.

Mixing conditions such as a rotation speed, a processing time, a temperature, a reaction pressure, or a gravitational acceleration applied to the mixture during the mechanical process of the mixture including lithium sulfide and phosphorus sulfide can be appropriately determined depending on the kind of the mixture or the amount thereof processed. In general, as the rotation speed increases, the glass production rate increases, and as the processing time increases, the glass conversion rate increases.

Typically, when X-ray diffraction analysis is performed using CuKα rays as a radiation source, if a diffraction peak derived from the raw material is lost or decreases, it can be determined that the mixture is vitrified and a sulfide-based inorganic solid electrolyte material in a vitreous state is obtained.

Here, in the step of vitrifying the mixture including lithium sulfide and phosphorus sulfide, it is preferable that the mechanical process is performed until the lithium ionic conductivity measured using an alternating current impedance method under measurement conditions of 27.0° C., an applied voltage of 10 mV, and a measurement frequency range of 0.1 Hz to 7 MHz is preferably $0.5\times10^{-4}$ $S\cdot cm^{-1}$ or higher and preferably $1.0\times10^{-4}$ $S\cdot cm^{-1}$ or higher. As a result, a sulfide-based inorganic solid electrolyte material having further improved lithium ionic conductivity can be obtained.

(Step (B))

Next, as in the example shown in FIG. 1(*a*) described below, a second inorganic material is obtained by crushing the first inorganic material prepared in the step (A) using a ball mill to obtain fine particles of the first inorganic material, the ball mill including a cylindrical container and crushing balls.

The step (B) includes a step (B1) of putting the first inorganic material and the crushing balls into the cylindrical container and subsequently rotating the cylindrical container about a cylindrical shaft and a step (B2) of moving the cylindrical container such that the first inorganic material moves in the cylindrical shaft direction.

Here, the step (B1) and the step (B2) may be performed simultaneously or separately. In addition, the step (B2) may be continuously performed while performing the step (B1), or the steps (B1) and (B2) may be performed intermittently.

It is preferable that, in the step (B), the first inorganic material is crushed in a dry state. When the first inorganic material is crushed in a dry state, an organic solvent or water as a dispersion medium is unnecessary, deterioration by a reaction or hydrolysis between the inorganic material and organic molecules can be prevented, a step of separating the organic solvent or water is unnecessary, and the manufacturing steps can be simplified.

Here, in the present embodiment, the ball mill including the cylindrical container and the crushing balls is a ball mill that rotates about a cylindrical shaft, and not include a planetary motion type ball mill.

In addition, it is preferable that the step (B) is performed in an inert atmosphere. As a result, a reaction of the inorganic material with water vapor, oxygen, or the like can be suppressed.

In addition, the inert atmosphere refers to a vacuum atmosphere or an inert gas atmosphere. In the inert atmosphere, in order to avoid contact with water, the dew point is preferably −30° C. or lower, more preferably −50° C. or lower, and still more preferably −60° C. or lower. The inert gas atmosphere refers to an atmosphere of inert gas such as argon gas, helium gas, or nitrogen gas. In order to prevent impurities from being mixed in a product, it is preferable that the purity of the inert gas is as high as possible. A method of introducing the inert gas into the mixed system is not particularly limited as long as it is a method capable of filling the mixed system with the inert gas atmosphere. Examples of the introduction method include a method of purging inert gas and a method continuously introducing inert gas at a given flow rate.

Crushing conditions such as a processing time, a temperature, a reaction pressure, or a gravitational acceleration applied to the inorganic material in the step (B) can be appropriately determined depending on the kind of the inorganic material or the amount thereof processed.

The rotation speed of the cylindrical container in the step (B1) is not particularly limited because it can be appropriately determined depending on the kind of the inorganic material or the amount thereof processed. For example, the rotation speed of the cylindrical container in the step (B1) is 30 rpm or higher and 200 rpm or lower and preferably 60 rpm or higher and 120 rpm or lower.

In addition, it is preferable that the rotation speed of the cylindrical container is a critical rotation speed or lower.

Here, the critical rotation speed refers to a speed at which the cylindrical container rotates in a state where the crushing balls are in close contact with an inner wall of the cylindrical container due to a balance between the centrifugal force of the crushing balls and the gravitational force. When the ball diameter of the crushing balls relative to the inner diameter D [m] of the cylindrical container can be ignored, the critical rotation speed (Nc) is represented by Nc [rpm]=42.3/D.

In the method of manufacturing an inorganic material according to the present embodiment, in the step (B2), the inorganic material is moved in the cylindrical shaft direction, for example, by reciprocating the cylindrical container in the cylindrical shaft direction and/or reciprocating at least one end of the cylindrical container in a direction perpendicular to the cylindrical shaft direction.

The speed of the reciprocation in the step (B2) is not particularly limited because it can be appropriately determined depending on the kind of the inorganic material or the amount thereof processed. For example, the speed of the reciprocation in the step (B2) is 1 cpm or higher and 30 cpm or lower and preferably 2 cpm or higher and 6 cpm or lower.

The diameter of the crushing balls is, for example, 0.1 mm or more and 10.0 mm or less and, from the viewpoint that a smaller average particle size can be obtained, is preferably 1.0 mm or more and 3.0 mm or less.

In the method of manufacturing an inorganic material according to the present embodiment, it is preferable that the crushing balls includes two or more kinds of crushing balls having different diameters, and it is more preferable that the crushing balls includes three or more kinds of crushing balls having different diameters. As a result, an inorganic material having a smaller average particle size can be obtained.

In addition, in the method of manufacturing an inorganic material according to the present embodiment, it is preferable that the crushing balls include first crushing balls having a diameter in a range of 1.5 mm or more and 2.5 mm or less and second crushing balls having a diameter in a range of 0.2 mm or more and less than 1.5 mm, and it is more preferable that the crushing balls further include third crushing balls having a diameter of more than 2.5 mm and 10.0 mm or less in addition to the first crushing balls and the second crushing balls. As a result, an inorganic material having a smaller average particle size can be obtained.

It is preferable that at least surfaces of the crushing balls are formed of at least one kind of material selected from a ceramic material and a metal material.

Examples of the metal material include centrifugally chilled cast steel, SUS, Cr-coated SUS, and Cr-coated quenched steel.

In addition, when at least surfaces of the crushing balls according to the present embodiment are formed of a ceramic material, incorporation of an unnecessary metal component derived from the crushing balls into the obtained inorganic material can be suppressed, and an inorganic material having a higher purity can be obtained.

Examples of the ceramic material include stabilized zirconia, alumina, silicon carbide, and silicon nitride.

In the method of manufacturing an inorganic material according to the present embodiment, optionally, a step of classifying the first inorganic material may be further performed before the step (B). By removing coarse particles from the first inorganic material through the classification operation, fine particles of the first inorganic material can be more effectively obtained in the Step (B). In addition, the above-described classification method is not particularly limited, and a well-known method such as a sieve can be used.

Regarding the second inorganic material obtained using the method of manufacturing an inorganic material according to the present embodiment, an average particle size $d_{50}$ in a weight average particle size distribution measured using a laser diffraction scattering particle size distribution measurement method is not particularly limited and is preferably 0.01 μm or more and 20 μm or less, more preferably 0.05 μm or more and 10 μm or less, still more preferably 0.10 μm or more and 8.0 μm or less, still more preferably 0.10 μm or more and 5.0 μm or less, and still more preferably 0.50 μm or more and 4.0 μm or less.

By adjusting the average particle size $d_{50}$ of the second inorganic material to be in the above-described range, for example, the energy density of an all-solid-state lithium ion battery can be further improved while maintaining excellent handling properties.

(Annealing Step)

In the method of manufacturing an inorganic material according to the present embodiment, from the viewpoint of further improving the lithium ionic conductivity of the obtained inorganic material, an annealing step of crystallizing at least a part of the inorganic material may be further performed. The annealing step may be performed before the step (B) or may be performed after the step (B). From the viewpoint that a smaller average particle size can be obtained, it is preferable that the annealing step is performed after the step (B).

By performing the annealing step, at least a part of the inorganic material in a vitreous state can be crystallized to obtain an inorganic material in a glass ceramic state. As a result, for example, an inorganic material having further improved lithium ionic conductivity can be obtained.

The temperature at which the inorganic material in the vitreous state is heated is not particularly limited as long as it is a temperature at which crystallization can be sufficiently accelerated. For example, from the viewpoint of effectively accelerating crystallization while suppressing thermal decomposition or the like of the inorganic material, the temperature is preferably in a range of 220° C. or higher and 500° C. or lower, more preferably in a range of 250° C. or higher and 400° C. or lower, still more preferably in a range of 260° C. or higher and 350° C. or lower, and still more preferably in a range of 270° C. or higher and 350° C. or lower.

The time for which the inorganic material is heated is not particularly limited as long as it is the time for which the desired inorganic material in the glass ceramic state can be obtained. For example, the time is in a range of 1 hour or longer and 24 hours or shorter, preferably 0.5 hours or longer and 8 hours or shorter, and more preferably 1 hour or longer and 3 hours or shorter. A heating method is not particularly limited, and examples thereof include a method using a calcination furnace. Conditions such as a temperature or a time during heating can be appropriately adjusted in order to optimize properties of the inorganic material.

In addition, it is preferable that the inorganic material is heated, for example, in an inert gas atmosphere. As a result, deterioration (for example, oxidation) of the inorganic material can be prevented.

Examples of the inert gas when the inorganic material is heated include argon gas, helium gas, and nitrogen gas. In order to prevent impurities from being mixed in a product, it is preferable that the purity of the inert gas is as high as possible. In addition, in order to avoid contact with water, the dew point is preferably −30° C. or lower, more preferably −50° C. or lower, and still more preferably −60° C. or lower. A method of introducing the inert gas into the mixed system is not particularly limited as long as it is a method capable of filling the mixed system with the inert gas atmosphere. Examples of the introduction method include a method of purging inert gas and a method continuously introducing inert gas at a given flow rate.

In the annealing step, it is preferable that, in a spectrum obtained by X-ray diffraction in which a CuKα ray is used as a radiation source, the annealing process is performed until a diffraction peak different from that of the inorganic material in the vitreous state is observed. Here, the observation of the diffraction peak different from that of the inorganic material in the vitreous state represents that at least a part of the inorganic material in the vitreous state is crystallized to enter a glass ceramic state.

Typically, when X-ray diffraction analysis is performed using CuKα rays as a radiation source, if a new diffraction peak different from the diffraction peak of the inorganic material in the vitreous state appears, it can be determined that the inorganic material is annealed to enter a glass ceramic state.

(Step (C))

Figure 2:
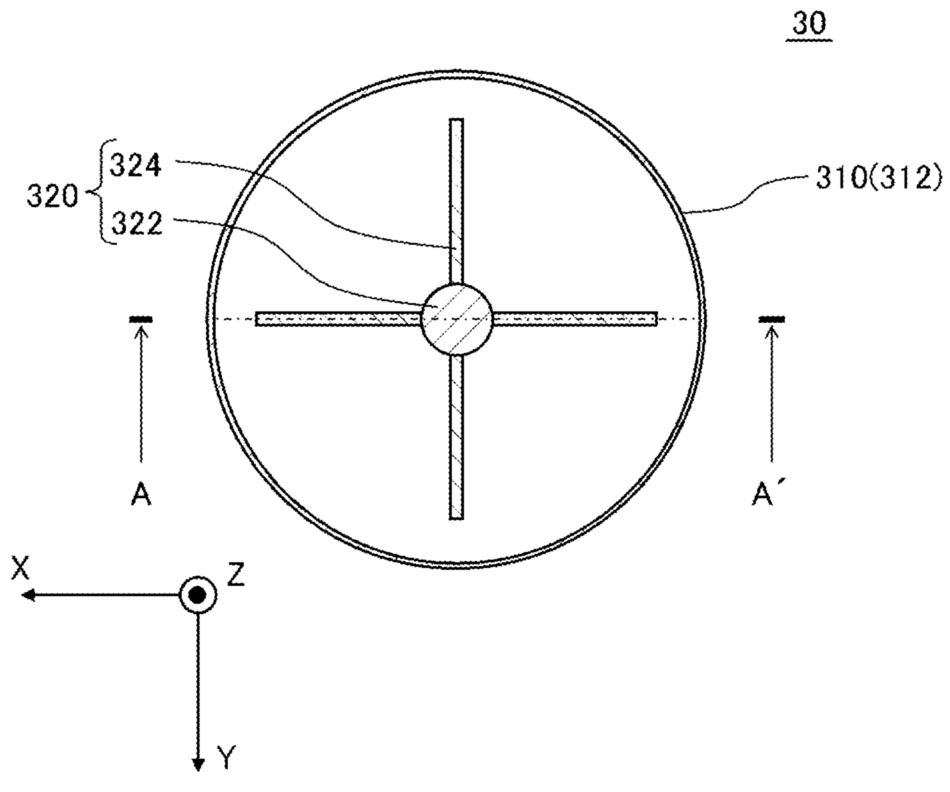
FIG. 2 is a schematic top view showing a separation device used in a step (C) of a method of manufacturing an inorganic material according to a first embodiment.
Figure 3:
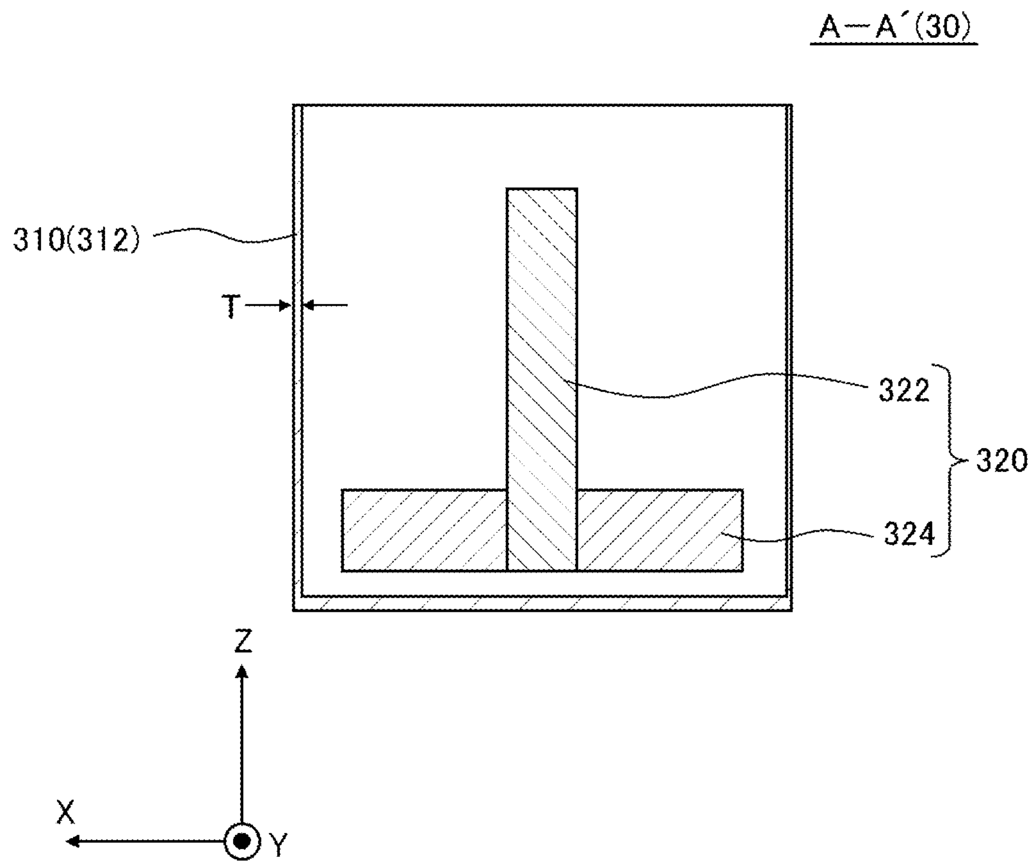
FIG. 3 is a schematic cross-sectional view taken along line A-A' of FIG. 2.

FIG. 2 is a schematic top view showing a separation device 30 used in the step (C) of the method of manufacturing an inorganic material according to the first embodiment. FIG. 3 is a schematic cross-sectional view taken along line A-A' of FIG. 2.

In FIGS. 2 and 3, a first direction X is a direction parallel to a horizontal direction that is perpendicular to a vertical direction. A second direction Y is a direction horizontal to the horizontal direction and is perpendicular to the first direction X. A third direction Z is a direction parallel to the vertical direction. Regarding an arrow indicating the first direction X, the second direction Y, or the third direction Z, a direction from a base end toward a distal end of the arrow is a positive direction of the direction indicated by the arrow, and a direction from the distal end toward the base end of the arrow is a negative direction of the direction indicated by the arrow. Regarding a white circle with a black point indicating the first direction X, the second direction Y, or the third direction Z, a direction from the depth to the front of the paper plane is a positive direction of the direction indicated by the arrow, and a direction from the front to the depth of the paper plane is a negative direction of the direction indicated by the arrow. The positive direction of the third direction Z is an upward direction of the vertical direction, and the negative direction of the third direction Z is a lower direction of the vertical direction. The same can be also applied to the first direction X, the second direction Y, and the third direction Z in the drawings described below.

The separation device 30 includes a container 310 and a stirring unit 320. The container 310 contains at least one crushing ball (not shown in FIGS. 2 and 3) after the step (B). The second inorganic material is attached to the crushing ball after the step (B). The stirring unit 320 is provided in the container 310. The stirring unit 320 includes a shaft portion 322 and a plurality of blade portions 324.

The container 310 has a cylindrical shape having an open upper end and a closed lower end. A side surface portion of the container 310 is formed of a mesh member 312. The mesh member 312 is formed of, for example, metal such as SUS304. The mesh member 312 may be provided on the entire side surface portion of the container 310 or may be provided on a part of the side surface portion of the container 310. The volume of the container 310 is not particularly limited and is, for example, 0.5 L or more and 2.0 L or less.

The shaft portion 322 extends parallel to the third direction Z. A plurality of blade portions 324 are attached to the side of the shaft portion 322. When seen from the third direction Z, the plurality of blade portions 324, specifically, four plate-shaped blade portions 324 are disposed at regular intervals in a circumferential direction of the shaft portion 322. The number and the disposition of the blade portions 324 attached to the shaft portion 322 are not limited to the example according to the embodiment. When the shaft portion 322 rotates, the plurality of blade portions 324 rotate to stir the crushing balls. As in the step (B), in the container 310, at least two kinds of crushing balls having different diameters may be stirred. The rotation speed of the shaft portion 322 can be, for example, 1500 rpm or higher and 3000 rpm or lower. When the crushing balls are stirred, the crushing balls collide against the mesh member 312. This way, in the embodiment, the crushing balls may be stirred in a region at least a part of which is surrounded by the mesh member 312.

In the embodiment, the crushing balls can be brought into contact with the mesh member 312 with a stronger force, for example, as compared to when the crushing balls are sieved through a sieve. Accordingly, the inorganic material attached to the crushing balls can be separated from the crushing balls within a shorter period of time as compared to a case where the crushing balls are sieved through a sieve.

Figure 4:
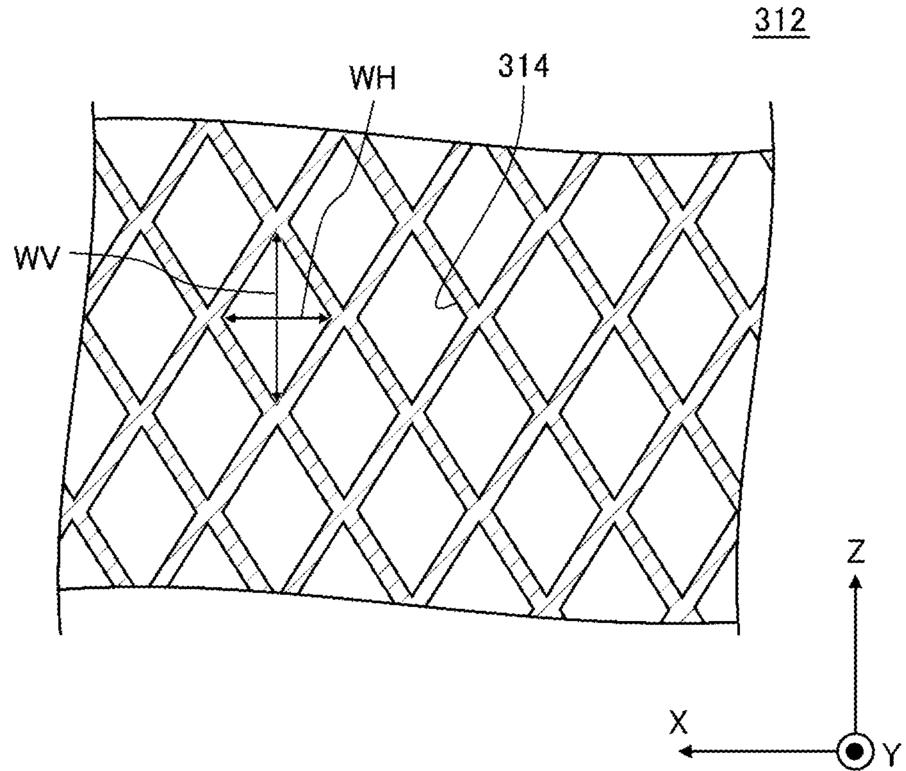
FIG. 4 is a schematic enlarged view showing a part of a mesh member according to the first embodiment.

FIG. 4 is a schematic enlarged view showing a part of the mesh member 312 according to the first embodiment.

In the mesh member 312, a plurality of holes 314 are disposed in a lattice shape, for example, by expanded metal. When seen in a depth direction of the holes 314, the holes 314 have a polygonal shape, specifically, a rhombic shape. That is, the hole 314 has a shape having a corner. In this case, as compared to a shape not having a corner, for example, a circle or an ellipse, the crushing balls collide against the corner of the hole 314 such that the inorganic material is more likely to fall off from the crushing balls. The corner does not need to be acute and may be rounded. In addition, the hole 314 may have a polygonal shape other than a rhombic shape, for example, a triangular shape, a quadrangular shape, a pentagonal shape, a hexagonal shape, or an octagonal shape. Alternatively, the hole 314 may have a shape not having a corner, for example, a circle or an ellipse.

A vertical width WV of the hole 314 is not particularly limited as long as the crushing ball does not pass through the hole 314, and can be, for example, 1.0 mm or more and 3.0 mm or less. A horizontal width WH of the hole 314 is not particularly limited as long as the crushing ball does not pass through the hole 314, and can be, for example, 1.0 mm or more and 3.0 mm or less. In addition, a thickness T of the mesh member 312 is not particularly limited and can be, for example, 0.50 mm or more and 1.00 mm or less. The size of the hole 314 may vary depending on positions of the container 310. For example, the size of the hole 314 in an upper portion of the container 310 may be different from the size of the hole 314 in a lower portion of the container 310.

At least a surface of the mesh member 312 is formed of a material having a Vickers hardness higher than a Vickers hardness of a material forming the crushing balls. For example, when the crushing balls are formed of $ZrO_2$, the mesh member 312 can be formed of stainless steel such as SUS304 coated with diamond-like carbon (DLC). When the Vickers hardness of the surface of the mesh member 312 is lower than the Vickers hardness of the crushing balls, the crushing balls collide against the mesh member 312 such that a part of the surface of the mesh member 312 is ground and impurity may be mixed in the second inorganic material. On the other hand, when the Vickers hardness of the surface of the mesh member 312 is higher than the Vickers hardness of the crushing balls, the mixing of impurity in the second inorganic material can be suppressed. The surface of the mesh member 312 may be formed of a material having a Vickers hardness lower than a Vickers hardness of a material forming the crushing balls.

Second Embodiment

Figure 5:
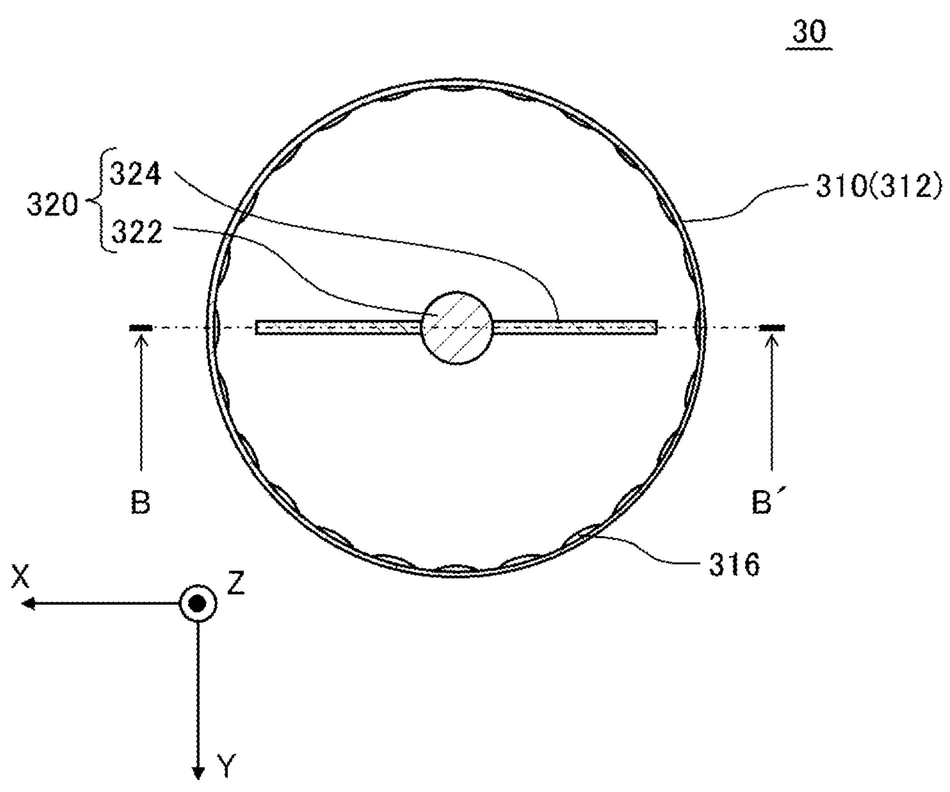
FIG. 5 is a schematic top view showing a separation device according to a second embodiment.
Figure 6:
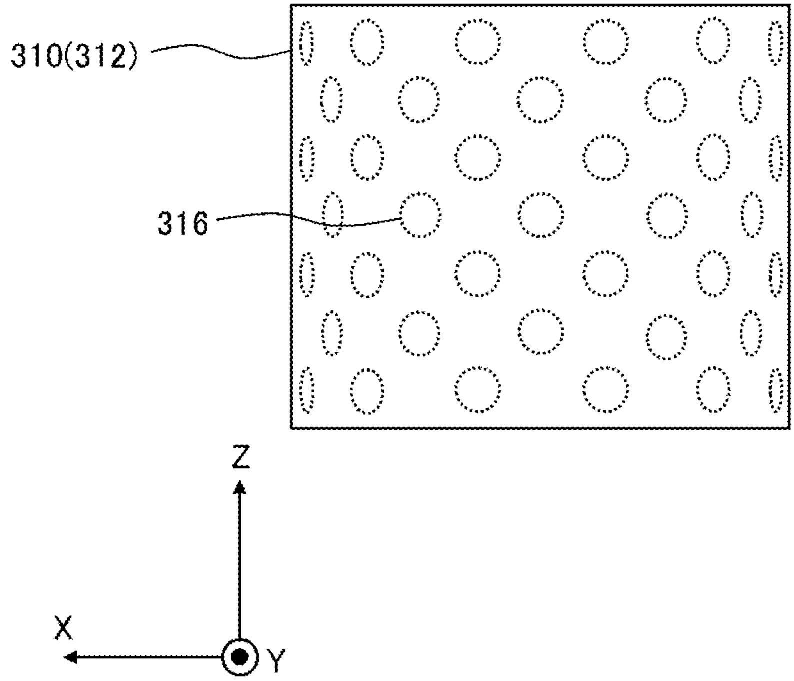
FIG. 6 is a schematic side view showing the separation device according to the second embodiment.
Figure 7:
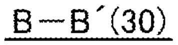
FIG. 7 is a schematic cross-sectional view taken along line B-B' of FIG. 5.
Figure 7:
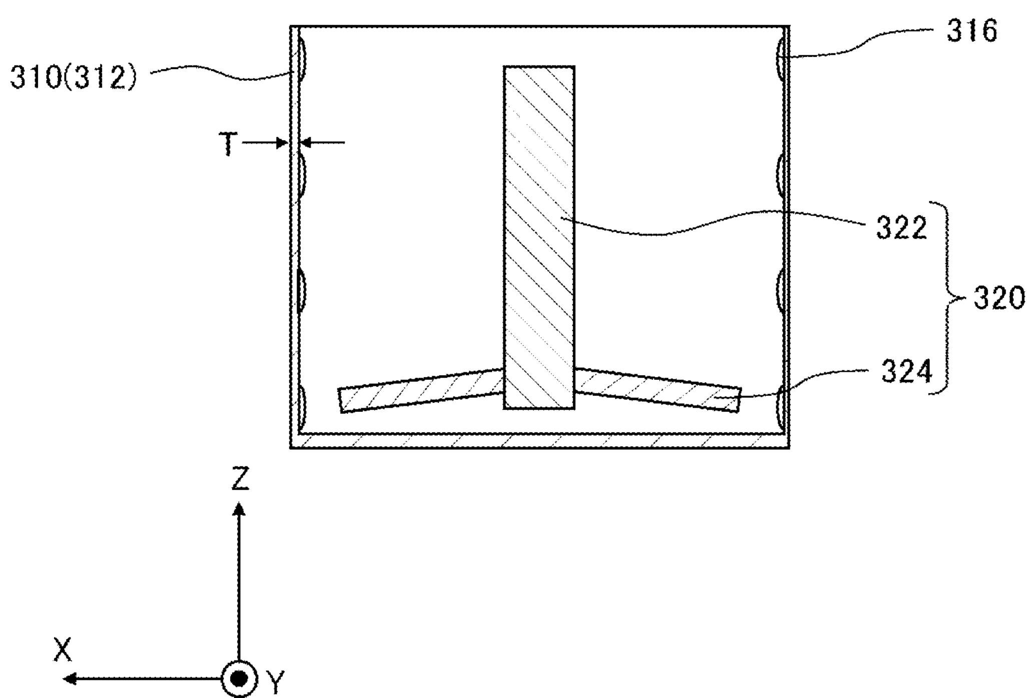
Figure 8:
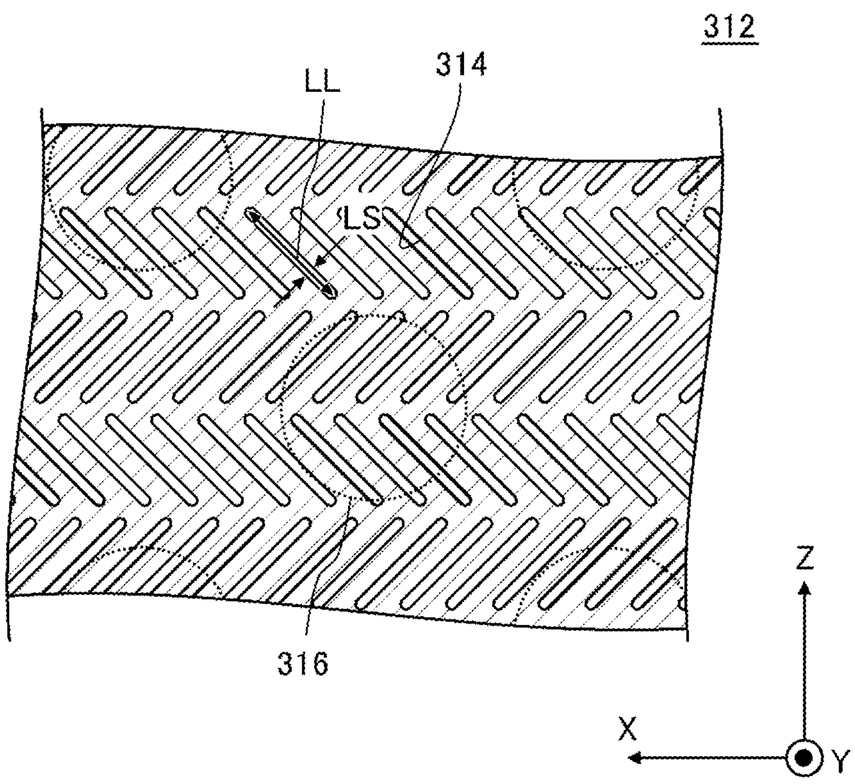
FIG. 8 is a schematic enlarged view showing a part of a mesh member according to the second embodiment.

FIG. 5 is a schematic top view of the separation device 30 according to a second embodiment. FIG. 6 is a schematic side view showing the separation device 30 according to the second embodiment. FIG. 7 is a schematic cross-sectional view taken along line B-B' of FIG. 5. FIG. 8 is a schematic enlarged view showing a part of the mesh member 312 according to the second embodiment. The separation device 30 according to the second embodiment is the same as the separation device 30 according to the first embodiment except for the following points.

In the embodiment, when seen in the third direction Z, two blade portions 324 are disposed at regular intervals in a circumferential direction of the shaft portion 322. The number and the disposition of the blade portions 324 are not particularly limited to the example according to the embodiment. In addition, the blade portion 324 has a rod shape. In this case, as compared to a case where the blade portion 324 has a plate shape, the mixing of impurity in the second inorganic material caused by wear of the blade portion 324 can be suppressed.

In the mesh member 312, a plurality of holes 314 are disposed in a herringbone shape, for example, by perforated metal. When seen in a depth direction of the hole 314, the hole 314 has an elongated shape. In this case, as compared to when the hole 314 has a shape other than an elongated shape, the crushing balls collide against an end portion of the hole in a longitudinal direction such that the inorganic material is more likely to fall off from the crushing balls.

A length LL of the hole 314 in the longitudinal direction is not particularly limited as long as the crushing ball does not pass through the hole 314, and can be, for example, 5.0 mm or more and 15.0 mm or less. A length LS of the hole 314 in a transverse direction is not particularly limited as long as the crushing ball does not pass through the hole 314, and can be, for example, 0.50 mm or more and 1.50 mm or less. In addition, a thickness T of the mesh member 312 is not particularly limited and can be, for example, 0.50 mm or more and 1.50 mm or less.

The mesh member 312 has at least one protrusion shape 316 that protrudes toward the region surrounded by the mesh member 312. The protrusion height of the protrusion shape 316 is, for example, 0.50 mm or more and 1.50 mm or less. In the embodiment, a plurality of protrusion shapes 316 are provided on an inner surface side of the container 310. The number of the protrusion shapes 316 provided in the container 310 may be only one. In the embodiment, a group of protrusion shapes 316 that are arranged in the third direction Z and another group of protrusion shapes 316 that are arranged in the third direction Z alternately with the group of protrusion shapes 316 are alternately arranged in the horizontal direction. The layout of the plurality of protrusion shapes 316 is not limited to the example according to the embodiment. When the protrusion shapes 316 are provided, as compared to when the protrusion shapes 316 are not provided, the movement of the crushing balls stirred in the container 310 can be made complicated, and the second inorganic material can be more easily separated from the crushing balls. The protrusion shapes 316 do not need to be provided.

Modification Example

Figure 9:
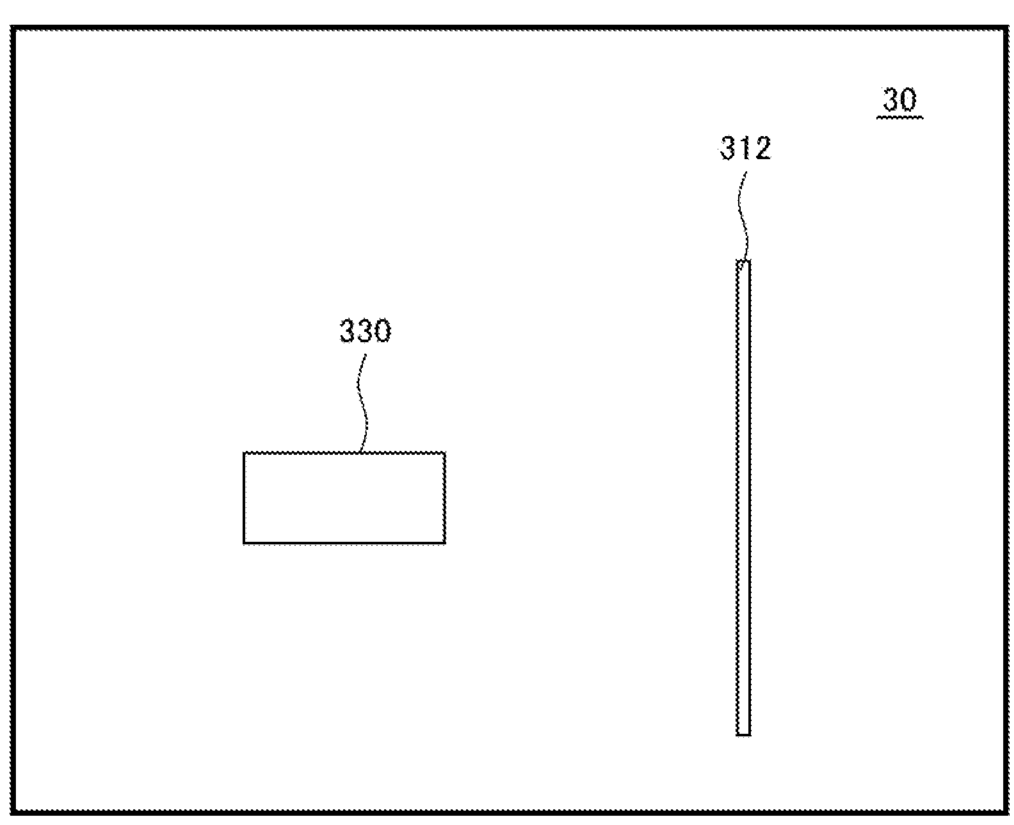
FIG. 9 is a schematic view showing a separation device according to a modification example.

FIG. 9 is a schematic view showing the separation device 30 according to a modification example. The separation device 30 according to the modification example is the same as the separation device 30 according to the first or second embodiment except for the following points.

The separation device 30 includes a blasting machine 330 that blasts the crushing balls (not shown) to the mesh member 312. The blasting machine 330 is, for example, a shot blasting machine. In the modification example, the crushing balls can be brought into contact with the mesh member 312 with a stronger force, for example, as compared to when the crushing balls are sieved through a sieve. Accordingly, the inorganic material attached to the crushing balls can be separated from the crushing balls within a shorter period of time as compared to a case where the crushing balls are shaken on a sieve in a horizontal direction.

Hereinabove, the embodiments and the modification example of the present invention has been described. However, the embodiment is merely an example of the present invention, and various configurations other than the above-described configurations can also be adopted.

In addition, the present invention is not limited to the above-described embodiments or the modification example, and modifications, improvements, and the like within a range where the object of the present invention can be achieved are included in the present invention. For example, in the first and second embodiments and the modification example, the step (C) includes a step of causing the crushing balls to collide against the mesh member. However, the step (C) may include a step of sieving the crushing ball through a sieve instead of the step of causing the crushing balls to collide against the mesh member. Even in this case, the second inorganic material attached to the crushing balls can be recovered.

EXAMPLES

Hereinafter, the present invention will be described in more detail using Examples and Comparative Examples. However, the present invention is not limited to these Examples and Comparative Examples.

[1] Measurement Method

First, a measurement method in the following Examples and Comparative Examples will be described.

(1) Particle Size Distribution

The particle size distribution of a sulfide-based inorganic solid electrolyte material obtained in each of Examples and Comparative Examples was measured with a laser diffraction method using a laser diffraction scattering particle size distribution analyzer (manufactured by Malvern Panalytical Ltd., Mastersizer 3000). Based on the measurement result, a particle size corresponding to a 50% cumulative value ($d_{50}$, average particle size) in the weight cumulative distribution of the sulfide-based inorganic solid electrolyte material was obtained.

(2) Verification of Aggregate

The state in a ball mill was observed to investigate whether or not an aggregate was formed after a sulfide-based inorganic solid electrolyte material in a vitreous state was crushed using the ball mill for a predetermined time.

(3) Verification of Scanning Electron Microscope (SEM) Image

The sulfide-based inorganic solid electrolyte material separated from the crushing balls was observed with a SEM to investigate whether or not an aggregate was present.

Example 1

(1) Preparation of First Inorganic Material

A sulfide-based inorganic solid electrolyte material in a vitreous state as the first inorganic material was prepared according to the following procedure.

Regarding the raw materials, $Li_2S$ (manufactured by Furukawa Co., Ltd., purity: 99.9%), $P_2S_5$ (manufactured by Kanto Chemical Co., Inc.), and $Li_3N$ (manufactured by Furukawa Co., Ltd.) were used.

First, in a glove box, $Li_2S$ powder, $P_2S_5$ powder, and $Li_3N$ powder ($Li_2S$:$P_2S_5$:$Li_3N$=71.1:23.7:5.3 (mol %)) were mixed to prepare a raw material inorganic composition.

Next, the raw material inorganic composition and 6200 g of $ZrO_2$ balls having a diameter of 25 mm were put into an alumina cylindrical container (inner volume: 5 L) in the glove box, and the cylindrical container was sealed.

Next, the alumina cylindrical container was attached to a ball mill machine, and a mechanochemical process was performed at 100 rpm for 500 hours such that the raw material inorganic composition was vitrified. Next, by sieving the obtained inorganic material through a sieve having a pore size of 20 μm, a sulfide-based inorganic solid electrolyte material ($Li_{10}P_3S_{12}$) in a vitreous state as the first inorganic material was obtained. Regarding the sulfide-based inorganic solid electrolyte material in the vitreous state as the first inorganic material, the average particle size $d_{50}$ was 4.5 μm, $d_{10}$ was 2.0 μm, and $d_{90}$ was 10 μm.

(2) Preparation of Second Inorganic Material

Next, 300 g of the sulfide-based inorganic solid electrolyte material in the vitreous state as the first inorganic material, 6200 g of $ZrO_2$ balls having a diameter of 2.0 mm, 1200 g of $ZrO_2$ balls having a diameter of 1.0 mm, and 1200 g of $ZrO_2$ balls having a diameter of 5.0 mm were put into an alumina cylindrical container (inner volume: 5 L) in a glove box, and the cylindrical container was sealed. Next, the alumina cylindrical container was attached to a ball mill machine, and the first inorganic material was crushed for 50 hours to obtain fine particles of the first inorganic material. As a result, a second inorganic material was obtained. Here, as shown in FIG. 1(*a*), a cylindrical container 100 was placed on a rotating table 101, the cylindrical container 100 was rotated about a cylindrical shaft X at 100 rpm, and both ends of the cylindrical container 100 were reciprocated at an oscillation cycle of 3 cpm in a direction perpendicular to the cylindrical shaft X direction by vertically oscillating cylindrical container 100.

Regarding the sulfide-based inorganic solid electrolyte material in the vitreous state as the obtained second inorganic material, the average particle size $d_{50}$ was 2.0 μm, $d_{10}$ was 1.0 μm, and $d_{90}$ was 3.0 μm.

In addition, an aggregate of the sulfide-based inorganic solid electrolyte material in the vitreous state was not observed in the ball mill after completion of the crushing of the sulfide-based inorganic solid electrolyte material ($Li_{10}P_3S_{12}$) in the vitreous state.

(3) Separation of Second Inorganic Material

As the separation device, a rice mill RSF-A100 (manufactured by Tiger Corporation) was prepared. The rice mill according to Example 1 has the same configuration as the separation device 30 according to the first embodiment and includes a container and a stirring unit.

The container has a cylindrical shape having an open upper end and a closed lower end and having an inner volume of 1.0 L. As in the example shown in FIG. 4, a side surface portion of the container was formed of a mesh member of SUS304 having a thickness of 0.8 mm, in which a plurality of rhombic holes having a vertical width of 2.9 mm and a horizontal width of 2.1 mm were disposed in a lattice shape by expanded metal in a lower portion of the container and a plurality of rhombic holes having a vertical width of 2.8 mm and a horizontal width of 2.5 mm were disposed in a lattice shape by expanded metal in an upper portion of the container.

As in the examples shown in FIGS. 2 and 3, the stirring unit includes a shaft portion and four plate-shaped blade portions that are arranged at regular intervals in a circumferential direction of the shaft portion.

After (2) the preparation of the second inorganic material above, 500 g of $ZrO_2$ balls having a diameter of 2.0 mm, $ZrO_2$ balls having a diameter of 1.0 mm, and $ZrO_2$ balls having a diameter of 5.0 mm were put into the container of the rice mill, and the shaft portion was rotated at 2000 rpm to stir the $ZrO_2$ balls for 30 seconds. By comparing the total mass of the $ZrO_2$ balls before (2) the preparation of the second inorganic material and the total mass of the $ZrO_2$ balls after (2) the preparation of the second inorganic material to each other, it was estimated that 0.106 g of the second inorganic material per 1 g of the $ZrO_2$ balls was attached to the $ZrO_2$ balls. After stirring, 52.7 g of the second inorganic material separated from the $ZrO_2$ balls was recovered. That is, the recovery rate of the second inorganic material was 99.4%.

Figure 10:
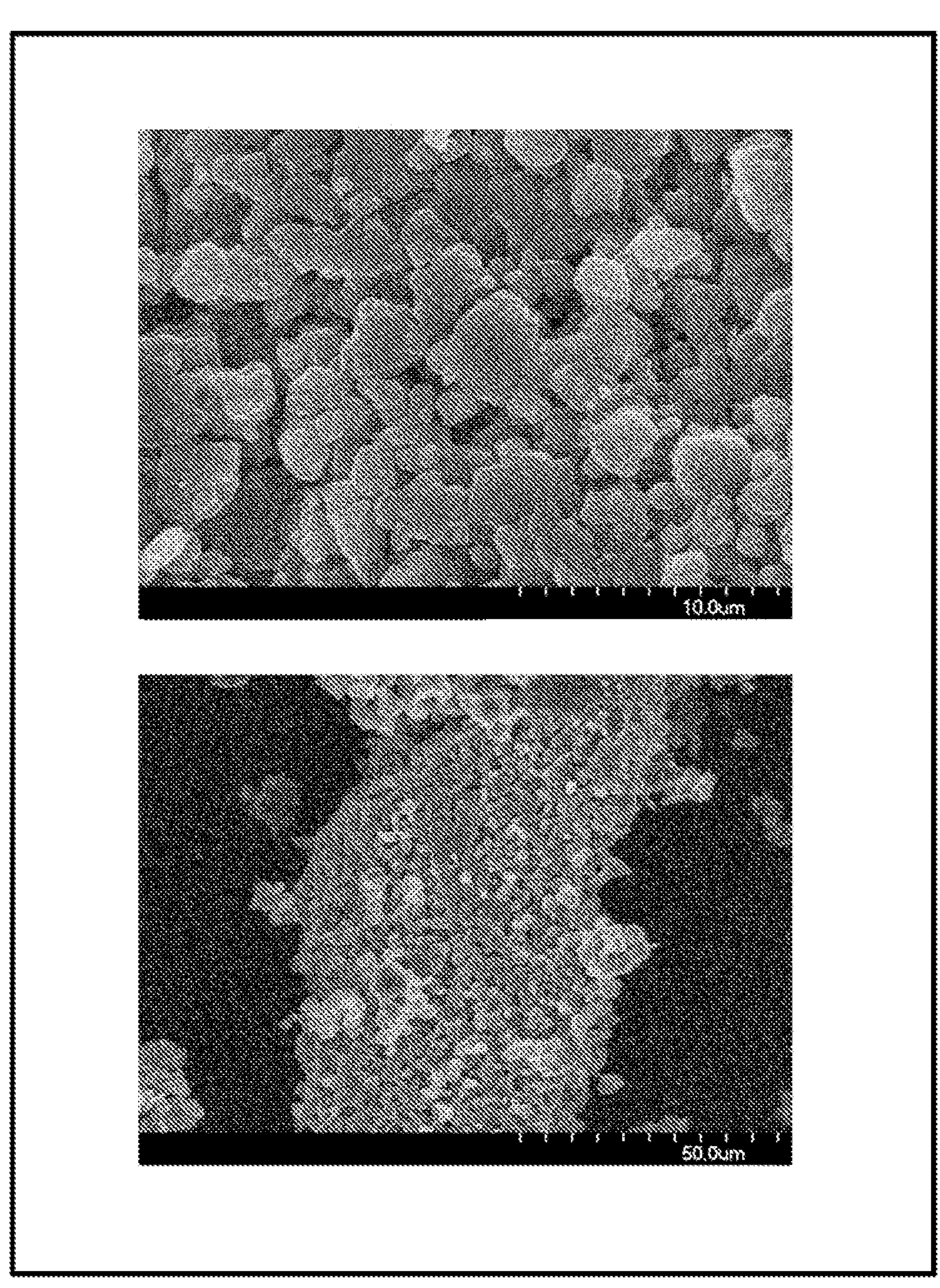
FIG. 10 is a diagram showing a SEM image of a second inorganic material separated from crushing balls according to Example 1.

FIG. 10 is a diagram showing a SEM image of the second inorganic material separated from crushing balls according to Example 1. An image in the upper section of FIG. 10 is an image at a magnification of 5000-fold, and an image in the lower section of FIG. 10 is an image at a magnification of 1000-fold. As shown in FIG. 10, substantially no aggregates were observed.

Example 2

(1) Preparation of First Inorganic Material and (2) Preparation of Second Inorganic Material (1) The preparation of the first inorganic material and (2) the preparation of the second inorganic material according to Example 2 were the same as (1) the preparation of the first inorganic material and (2) the preparation of the second inorganic material according to Example 1.

(3) Separation of Second Inorganic Material

As a separation device, a rice mill RCI-B5-W (manufactured by Iris Ohyama Inc.) was prepared. The rice mill according to Example 2 has the same configuration as the separation device 30 according to the second embodiment and includes a container and a stirring unit.

The container has a cylindrical shape having an open upper end and a closed lower end and having an inner volume of 1.0 L. As in the example shown in FIG. 8, the side surface portion of the container was formed of a mesh member of SUS304 having a thickness of 0.8 mm, in which a plurality of elongated holes having a length of about 9 mm in the longitudinal direction and a length of about 1 mm in the transverse direction were arranged in a herringbone shape by perforated metal. As in the examples shown in FIGS. 5 to 8, on the inner wall of the container, three protrusion shapes arranged in the vertical direction and four protrusion shapes arranged in the vertical direction alternately with the three protrusion shapes were alternately provided in the horizontal direction. The protrusion height of the protrusion shapes was about 1 mm.

As in the examples shown in FIGS. 5 to 7, the stirring unit includes a shaft portion and two rod-shaped blade portions that are arranged at regular intervals in a circumferential direction of the shaft portion.

After (2) the preparation of the second inorganic material above, 400 g of $ZrO_2$ balls having a diameter of 2.0 mm, $ZrO_2$ balls having a diameter of 1.0 mm, and $ZrO_2$ balls having a diameter of 5.0 mm were put into the container of the rice mill, and the shaft portion was rotated at 2000 rpm to stir the $ZrO_2$ balls for 30 seconds. By comparing the total mass of the $ZrO_2$ balls before (2) the preparation of the second inorganic material and the total mass of the $ZrO_2$ balls after (2) the preparation of the second inorganic material to each other, it was estimated that 0.106 g of the second inorganic material per 1 g of the $ZrO_2$ balls was attached to the $ZrO_2$ balls. After stirring, 42.2 g of the second inorganic material separated from the $ZrO_2$ balls was recovered. That is, the recovery rate of the second inorganic material was 99.5%.

Figure 11:
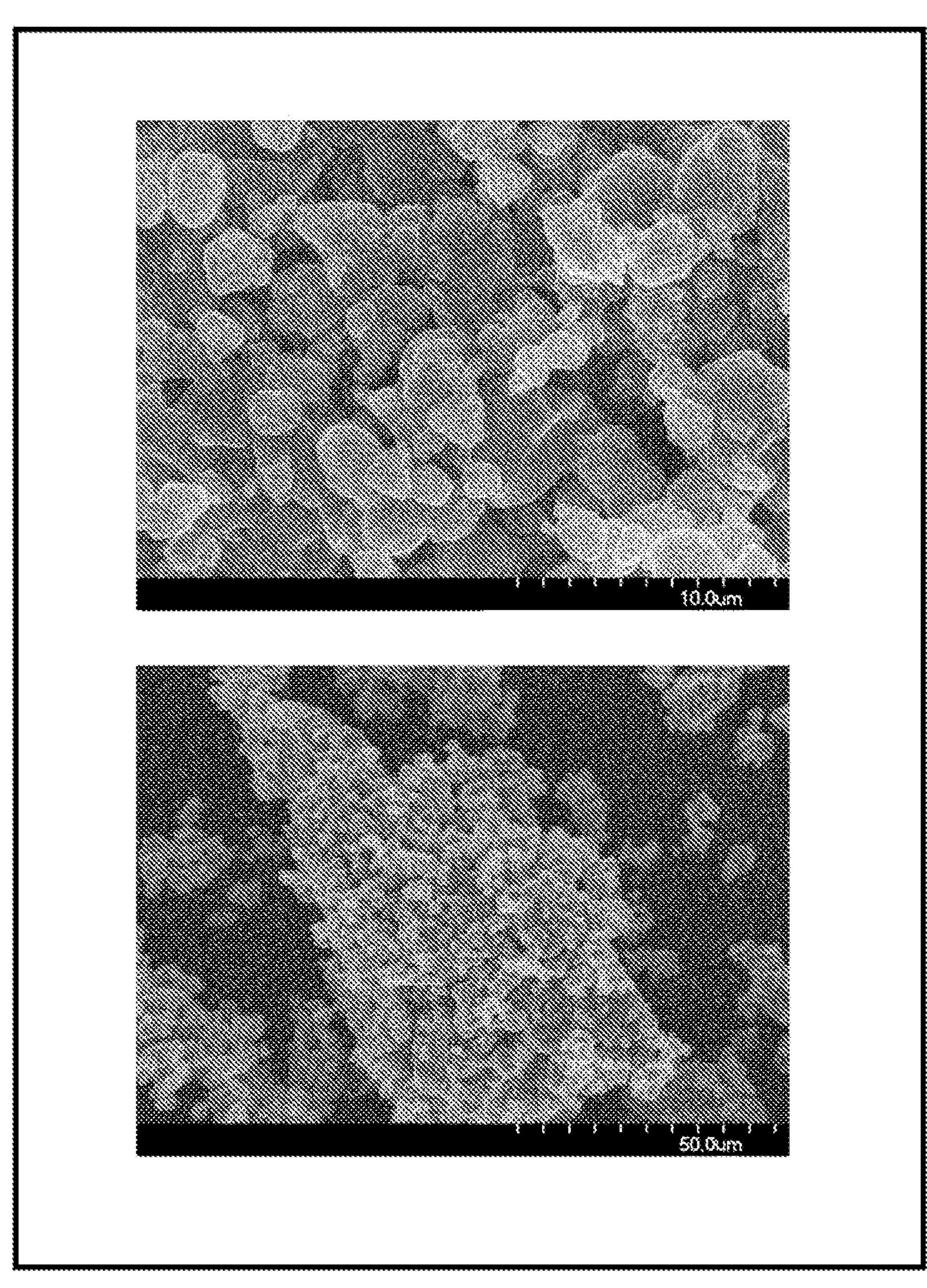
FIG. 11 is a diagram showing a SEM image of a second inorganic material separated from crushing balls according to Example 2.

FIG. 11 is a diagram showing a SEM image of the second inorganic material separated from crushing balls according to Example 2. An image in the upper section of FIG. 11 is an image at a magnification of 5000-fold, and an image in the lower section of FIG. 11 is an image at a magnification of 1000-fold. As shown in FIG. 11, substantially no aggregates were observed. In addition, the number of aggregates observed in Example 2 was less than the number of aggregates observed in Example 1.

Comparative Example

A sulfide-based inorganic solid electrolyte material in a vitreous state was prepared using the same method as that of Examples, except that the cylindrical container 100 was not vertically oscillated (that is, the step (B2) was not performed) as shown in FIG. 1(*b*).

Regarding the sulfide-based inorganic solid electrolyte material in the vitreous state as the obtained second inorganic material, the average particle size $d_{50}$ was 9.8 μm, $d_{10}$ was 4.0 μm, and $d_{90}$ was 14.7 μm.

In addition, an aggregate of the sulfide-based inorganic solid electrolyte material in the vitreous state was observed in the ball mill after completion of the crushing of the sulfide-based inorganic solid electrolyte material ($Li_{10}P_3S_{12}$) in the vitreous state.

It can be understood from a comparison between Examples 1 and 2 and Comparative Example that, in the manufacturing method according to Examples where the step (B2) was performed, the formation of an aggregate was suppressed and an inorganic material having a smaller average particle size was able to be obtained. It can be said that, when the step (B2) is performed, the more second inorganic material can be attached to the crushing balls than the second inorganic material be attached to the inner wall of the cylindrical container as compared to when the step (B2) is not performed. Further, it can be said that, by performing the step (C), the second inorganic material attached to the crushing balls can be recovered.

The present application claims priority based on Japanese Patent Application No. 2020-173894 filed on Oct. 15, 2020, the entire content of which is incorporated herein by reference.

REFERENCE SIGNS LIST

30: separation device
100: cylindrical container
101: rotating table
310: container
312: mesh member
314: hole
316: protrusion shape
320: stirring unit
322: shaft portion
324: blade portion
X: cylindrical shaft

The invention claimed is:

1. A method of manufacturing an inorganic material, the method comprising:

a step (A) of preparing a first inorganic material as a raw material;

a step (B) of obtaining a second inorganic material by crushing the first inorganic material using a ball mill to obtain fine particles of the first inorganic material, the ball mill including a cylindrical container and crushing balls; and a step (C) of separating the second inorganic material from the crushing balls to which the second inorganic material is attached, wherein the step (B) includes a step (B1) of putting the first inorganic material and the crushing balls into the cylindrical container and subsequently rotating the cylindrical container about a cylindrical shaft and a step (B2) of moving the cylindrical container such that the first inorganic material moves in a cylindrical shaft direction wherein the step (B1) and the step (B2) are performed simultaneously, and wherein in the step (B2), the first inorganic material is moved in the cylindrical shaft direction by reciprocating at least one end of the cylindrical container in a direction perpendicular to the cylindrical shaft direction.

2. The method of manufacturing an inorganic material according to claim 1, wherein the step (C) includes a step of causing the crushing balls to collide against a mesh member.

3. The method of manufacturing an inorganic material according to claim 2, wherein the step of causing the crushing balls to collide against the mesh member includes a step of stirring the crushing balls in a region at least a part of which is surrounded by the mesh member.

4. The method of manufacturing an inorganic material according to claim 3, wherein at least one hole formed in the mesh member has a polygonal shape or an elongated shape.

5. The method of manufacturing an inorganic material according to claim 3, wherein the mesh member has at least one protrusion shape that protrudes toward the region surrounded by the mesh member.

6. The method of manufacturing an inorganic material according to claim 3, wherein the step of stirring the crushing balls include a step of stirring at least two kinds of crushing balls having different diameters in the region surrounded by the mesh member.

7. The method of manufacturing an inorganic material according to claim 2, wherein at least a surface of the mesh member is formed of a material having a Vickers hardness higher than a Vickers hardness of a material forming the crushing balls.

8. The method of manufacturing an inorganic material according to claim 1, wherein in the step (B), the first inorganic material is crushed in a dry state.

9. The method of manufacturing an inorganic material according to claim 1, wherein each of the first inorganic material and the second inorganic material is an inorganic solid electrolyte material, a positive electrode active material, or a negative electrode active material.

10. The method of manufacturing an inorganic material according to claim 1, wherein each of the first inorganic material and the second inorganic material includes a sulfide-based inorganic solid electrolyte material.

11. The method of manufacturing an inorganic material according to claim 10, wherein the sulfide-based inorganic solid electrolyte material has lithium ionic conductivity and includes Li, P, and S as constituent elements.

12. The method of manufacturing an inorganic material according to claim 11, wherein a molar ratio Li/P of a content of Li to a content of P in the sulfide-based inorganic solid electrolyte material is 1.0 or higher and 10.0 or lower, and a molar ratio S/P of a content of S to the content of P in the sulfide-based inorganic solid electrolyte material is 1.0 or higher and 10.0 or lower.

13. The method of manufacturing an inorganic material according to claim 10, wherein the sulfide-based inorganic solid electrolyte material as the first inorganic material is in a vitreous state.

14. The method of manufacturing an inorganic material according to claim 1, wherein the crushing balls in the step (B) includes two or more kinds of crushing balls having different diameters.

15. The method of manufacturing an inorganic material according to claim 14, wherein the crushing balls include first crushing balls having a diameter in a range of 1.5 mm or more and 2.5 mm or less and second crushing balls having a diameter in a range of 0.2 mm or more and less than 1.5 mm.

16. The method of manufacturing an inorganic material according to claim 15, wherein the crushing balls further include third crushing balls having a diameter of more than 2.5 mm and 10.0 mm or less.

17. A method of manufacturing an inorganic material, the method comprising:

a step (A) of preparing a first inorganic material as a raw material;

a step (B) of obtaining a second inorganic material by crushing the first inorganic material using a ball mill to obtain fine particles of the first inorganic material, the ball mill including a cylindrical container and crushing balls; and a step (C) of separating the second inorganic material from the crushing balls to which the second inorganic material is attached, wherein the step (B) includes a step (B1) of putting the first inorganic material and the crushing balls into the cylindrical container and subsequently rotating the cylindrical container about a cylindrical shaft and a step (B2) of moving the cylindrical container such that the first inorganic material moves in a cylindrical shaft direction, wherein the step (C) includes a step of causing the crushing balls to collide against a mesh member, and wherein the step of causing the crushing balls to collide against the mesh member includes a step of blasting the crushing ball to the mesh member.

* * * * *